March 21, 1961 R. L. BETHEL 2,976,344
CABLE SPACER
Filed March 2, 1959
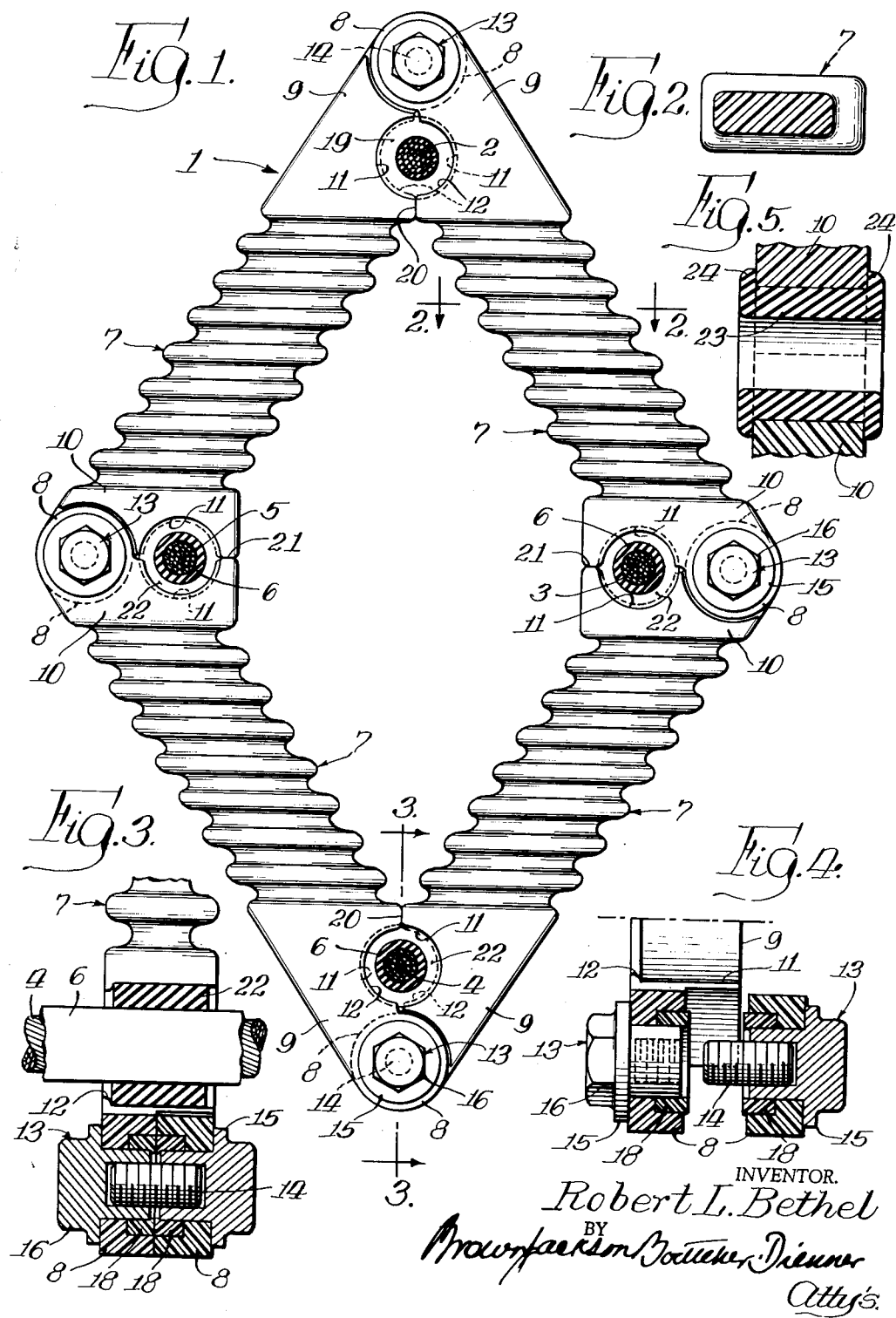
INVENTOR.
Robert L. Bethel
BY
Brown, Jackson, Boettcher, Dienner
Atty's.

United States Patent Office 2,976,344
Patented Mar. 21, 1961

2,976,344
CABLE SPACER
Robert L. Bethel, 149 Raymond Ave., Barrington, Ill.
Filed Mar. 2, 1959, Ser. No. 796,475
8 Claims. (Cl. 174—146)

This invention relates to cable spacers.

The present invention makes provision for maintaining the spacing between phase cables disposed on relatively close centers in overhead distribution system. With the development of high quality insulation, such as polyethylene for electric cable operating at voltages of from about 2 to 15 kv. it is feasible to support the conductors of a three phase system on relatively close centers and on extended spacing between poles by the use of suitable spacer elements suspended from messenger wires.

This is particularly desirable where limited space or heavy tree conditions make open wire construction difficult or too expensive. By utilizing phase conductors insulated with, for example, $10/64''$ thick polyethylene insulation, it is feasible and possible by the use of the present invention to suspend the three phase conductors in a suitable equilateral triangular arrangement in the three lower corner positions of a quadrilateral figure. The upper or fourth position is occupied by the messenger wire or cable from which the spacer is suspended. The messenger wire may serve as the neutral or ground wire for a three phase system connected in Y. The connection of the messenger and of the other conductors may be varied, since the invention is not in the electrical connection of the conductors and messenger wire.

The preferred form of the cable spacer of the present invention is an open four-sided diamond shaped ring-like figure constructed of four identical links connected together by pins disposed at the corners. The links have mating abutments or shoulders and mating seat portions for forming seats or grips for the messenger and for the phase conductors.

Grommets of rubber or similar resilient insulating material may be interposed between said seats or grips and the insulated cable and/or the messenger wire.

The pinning or otherwise fastening together the links of the spacer is advantageously made by pins or other fastening means disposed outside the conductors. The means connecting the link may be so constructed that it may be manipulated by an insulated stick or tool while the conductors are hot. The pins may advantageously be made entirely of insulating material. Alternatively, the pin may comprise a central metal stud enclosed by insulation.

The links are provided with transverse corrugated surfaces for increasing the surface creepage distance between the ends and the corrugations are preferably so disposed as to be equally effective whether the links lie above the median plane or below the same. The links in the preferred form of the spacer are identical. The four-sided figure might also be made of two or more different links if it were sufficiently advantageous to do so. Preferably, the angles between links are 60° at top and bottom, and 120° at the sides. These proportions may be varied.

The links of the spacer may be made of "Plexiglas" plastic. Other kinds of moulded insulation may be employed.

An advantage of the preferred form of construction is the simplicity of manufacture, storage, handling and assembly of the spacer from a single form of link requiring only a single mould for its production.

Now in order to acquaint those skilled in the art with the manner of constructing and operating a device in accordance with the present invention, I shall describe, in connection with the accompanying drawings, a specific embodiment of the same.

In the drawings:

Figure 1 is a side elevational view of the bracket of my invention showing the messenger wires and phase conductor cables in cross section;

Figure 2 is a transverse section taken on the line A—A of Figure 1, looking in the direction of the arrows;

Figure 3 is a cross sectional view taken on the line 3—3 looking in the direction of the arrows; and Figure 4 is a sectional view similar to Figure 3 showing the parts about to be assembled;

Figure 5 is a cross sectional view of a modified form of grommet held in the grip of the bracket or spacer.

Referring first to Figure 1, the spacer 1 therein shown is adapted for support upon a messenger cable which in turn is supported upon poles in the usual manner. The poles may be spaced at a greater distance than is customary for open conductor cable support for distribution service. Spacers, such as shown in Figure 1, are preferably located at the poles and at intermediate points between poles approximately 35 feet apart from each other. The spacers may, if desired, be disposed only at points intermediate the supporting poles. The spacing may vary with the weight of the conductors as desired. The dimensions will be varied as found desirable. The messenger cable 2 is a stranded high strength steel cable which may serve as a grounded neutral for a Y-connection of the three phase conductors 3, 4 and 5. It may serve as an independent ground wire. These phase conductors are preferably held at the apices of an equilateral triangle by the spacer 1. In the preferred practice of the invention, these phase conductors are each insulated with a sheath of polyethylene insulation indicated at 6. This may, by way of example, be $10/64''$ thick.

The spacer 1 comprises four links 7 which are in the preferred form made of identical form from a single mould. Each link 7 terminates in a hinge or knuckle portion 8, 8, which is approximately one-half the thickness of the adjacent end portion 9 at the 30° end of the link and of the end portion 10 at the 60° end portion of the same link. That is to say, the hinge or knuckle portions on each link lie on the outer side of the longitudinal axis of the link, and the one end face of each link is disposed in a plane which lies at 30° to the longitudinal axis of the link, and the end face of the other end 10 of the link lies in a plane disposed at an angle of 60' to the longitudinal axis of the same link. The end faces of the hinged links engage each other to limit the angular motion toward each other. This prevents distortion or collapse of the spacer when it is in assembled form and serves to prevent any undue pressure being applied to the phase conductors which might be injurious to the insulation thereof. The aforesaid end faces of the link are formed with semi-cylindrical recesses 11, 11 as shown in Figure 3, with a short radially inwardly extending rim or flange 12 on the same lateral side of the recess at each end of the link, whereby when the four links are assembled in alternately reversed relation, one such rim or flange 12 will lie on one end and the other on the opposite end of the cylindrical grip or socket formed between adjacent ends of hingedly connected links.

The hinge portions 8, 8 are connected by pins, preferably formed as shown in detail in Figure 3. A pair of moulded fiber glass cup screws 13, 13 have cylindrical shanks which are internally threaded to screw upon the opposite ends of a non-metallic threaded stud member 14. The stud 14 may optionally be made of a corrosion resistant metal such as aluminum or bronze. These cup screws 13 have flanges 15 for engaging the margins of the openings 15 and polygonal heads 16, 16 which may be of hexagonal form for engagement by a socket wrench or the like. The bores of the hinge ends 8, 8 are recessed on the inside as at 17, 17 to receive soft cylindrical nylon bushings 18, 18 which form a tight packing about the cylindrical shanks of the cup screws 13, 13 and seal the joint between the shanks of the cup screws and between the hinge ends 8, 8 of connected links. This packing may be formed of other kinds of plastics suitable for the purpose.

The connecting means or hinge pins for the ends of the links may thereby be constituted entirely or partly of non-metallic materials of adequate strength, and these hinge pin elements may be manipulated by insulated tools or "hot stick" members to release and/or fasten any particular pin connection even though the conductors are under impressed voltage.

The four links may initially be assembled with, for example, the lowermost pin unconnected, so that the spacer may be handled as a unit in applying the same, first, to the messenger wire, with a suitable grommet 19 of rubber, plastic, or other insulating material interposed, and then to the phase conductors 3, 4 and 5. When the upper two adjacent links 7, 7 are swung into position, as shown in Figure 1, where the semi-cylindrical groove portions 11, 11 define a grip or socket for receiving said grommet 19 and its included messenger cable 2, the meeting faces of the adjacent links abut at 21, 21, whereby the grommet 19 is substantially completely enclosed peripherally. Then with the disposition of grommets 22, 22 and conductors 3 and 5 in the cylindrical grooves at each side of the spacer, the conductors 3 and 5 may be received and clamped by swinging the two lower links 7, 7 first opened to receive the grommets and conductors, and then towards each other to close the grooves together to form grips or sockets, as above described. The grommets 22, 22 are preferably made of plastic or rubber. Also, as the two lower ends of the lower links 7, 7 approach each other, the grommet and cable of the conductor 4 are gripped between the grooved portions 11, 11, and the entire assembly is locked up by fastening of the two cup screws 13, 13 to each other upon the enclosed threaded stud 14.

The lateral surfaces of the links between the gripping and hinge portions are corrugated to provide an extended creepage surface, these corrugations preferably being disposed on parallel horizontal lines, as shown on the drawings. However, the configuration of the surface may be varied for the particular purpose desired.

While I have shown as a preferred form the disposition of hollow cylindrical grommets of straight tubular form held endwise between the inwardly extending rims or flanges 12, 12, I may employ flanged grommets seated in straight cylindrical openings, as shown in Figure 5. In that construction, the grommet 23 has a cylindrical body portion and flanged ends 24, 24 overhanging the margins of the cylindrical opening formed by the semi-cylindrical recesses in the adjacent ends of links 7, 7.

The degree of compression which is put upon the grommets, and hence upon the conductors 5 with their insulating sheets, may be controlled by design and dimension of the parts. The gripping effect should be sufficient to cause the spacer to be retained in place where it is initially installed.

By way of example, the phase conductors 3, 4 and 5 may be installed on centers of about 7¾ inches for a voltage of from 2400 to 7200 Y-connected. The gripping sockets may be of a diameter of the order of one inch, more or less, depending upon the size of the conductors to be held. The diameter of the phase conductors will affect the thickness of the grommets required for a given size of socket or grip.

There is a great advantage in keeping the number of parts at a minimum. It will be apparent from the above disclosure that the spacer itself is made up in the form of a ring consisting of four identical links, and four pins, each pin being made up of two identical cup screws and the threaded stud. In addition, two bushings of identical configuration and size are employed at each hinge pin to keep moisture out of the joint and also to hold the parts frictionally in threaded engagement against loosening. The grommets for the three conductors are the same, and the grommet for the messenger is always the same for a given size of messenger wire and grip or socket. Consequently, the parts for making up the spacer of my invention are few, and it is simple to stock these parts for making up the spacer.

The installation is simple. The four links are first assembled in hinged relation with one joint open. The spacer is opened up by swinging the upper links outwardly and hooked over the messenger so as to embrace and fold upon the messenger and phase conductors and then the lower links are swung together to close the ring and the lower hinge pin is secured to close up and clamp the spacer on the conductors and messenger. The hinge pins are all on the outside of the conductors. This simplifies maintenance or replacement. This may be done with "hot sticks" if necessary. There are no concealed surfaces between conductors where contamination may accumulate and cause wet weather breakdown or corona which might destroy the cable insulation. The conductors and the messenger are completely enclosed by the spacer, and could not be dislodged from position except by destruction of the spacer. The high creepage distance provided by the corrugated surfaces and the closed grips enclosing the conductors would make operation of the line possible, even if the conductor sheath insulation were destroyed or if it failed. The spacer may be stored and shipped in compact form and assembled with minimum of difficulty.

I do not intend to be limited to the details shown and described, since modifications and alterations within the scope of the invention as defined in the appended claims will occur to those skilled in the art. Particularly, the dimensions are not intended as limiting, but as illustrative.

I claim:

1. A conductor spacer of the class described comprising four identical links each link having at each end a hinge portion for forming with the adjacent end of another link a hinge joint, a seat portion of substantially semi-cylindrical concave form at each end of each link and at the same side of the hinge portion at each end, and a shoulder lying at the side of each seat portion remote from the hinge portion for engaging with a shoulder of an adjacent seat portion on the end of an adjacent link to provide a complete split cylinder for embracing a conductor and for establishing the angular position of adjacent links relative to each other.

2. A link of the class described comprising a bar of moulded insulation having a longitudinal axis, a hinge joint portion at each end having a hinge axis normal to said longitudinal axis, a semi-cylindrical concave seat portion at each end adjacent the corresponding hinge portion, and a shoulder portion at each end adjacent the corresponding seat portion, said bar having a face at one end disposed at an angle of substantially 30° to the longitudinal axis of the link, and having a face at the other end disposed at an angle of substantially 60° to the longitudinal axis of the link each of said faces lying in a plane extending through the axis of the adjacent hinge .

3. The link of claim 2 wherein the lateral surface of the link between its ends are provided with parallel corrugations disposed at an angle substantially of 60° to the longitudinal axis of the link.

4. A spacer for conductors comprising four links hinged to each other end to end, the links being disposed substantially in a common plane and at angles of 60° and 120° alternately with respect to each other, the adjacent ends of connected links having mating semi-cylindrical seat portions adapted to be swung together to form closed cylinders to receive and hold cylindrical conductors, said links when disconnected at one hinge joint being capable of swinging about the other hinge joints to separate said seat portions.

5. A cable spacer comprising a series of substantially identical insulating links hinged together end to end to form a ring-like geometrical figure lying substantially in a single plane, each end of each link comprising a hinge member and a shoulder member with a concave seat portion between the hinge member and the shoulder member, said concaved seat portions of adjacent ends registering to form substantially complete cylindrical openings for receiving insulated conductors and holding them in fixed spaced relation out of contact with each other, said links having hinge pins for said hinges at least one of which pins is releasable.

6. In a cable spacer, four links of insulating material disposed in a ring-like figure and having adjacent ends hinged together, each of said ends comprising a hinge member and a shoulder member with a concave seat portion between the hinge member and the shoulder member, said concave seat portions registering to form a complete cylinder for receiving an insulated conductor and insulating means for holding said links in fixed position relative to each other, said spacer being adapted to embrace and be supported from a messenger wire.

7. In a device of the class described for suspending three insulated phase conductors in spaced parallel relation below and from a messenger wire, the combination of four substantially identical links of insulation connected together at their ends to comprise a closed ring surrounding and lying outside of said messenger wire and said phase conductors, said links having registering substantially semi-cylindrical recesses adjacent the connected ends thereof providing substantially closed cylindrical sockets for receiving and embracing resilient grommets, and resilient grommets adapted to surround said conductors and said messenger wire disposed in said sockets.

8. In a device of the class described, an open ring-like structure, comprising a series of four links engaging each other only at their ends, the adjacent ends of adjacent links having connecting portions which are pin jointed together and having interengaging shoulders for determining the angular position of adjacent links relative to each other when the ring is closed, there being a concave seat disposed adjacent the connecting portion on each end of each link, said seats on adjacent link ends matching to provide substantially closed cylindrical grips for holding a wire in fixed position relative to the ring-like structure.

References Cited in the file of this patent

UNITED STATES PATENTS

| | | |
|---|---|---|
| 308,818 | Arnold | Dec. 2, 1884 |
| 824,544 | Hossege | June 26, 1906 |
| 2,820,083 | Hendrix | Jan. 14, 1958 |
| 2,912,482 | Horrocks et al. | Nov. 10, 1959 |

FOREIGN PATENTS

| | | |
|---|---|---|
| 722,084 | Great Britain | Jan. 19, 1955 |
| 768,339 | Great Britain | Feb. 13, 1957 |

OTHER REFERENCES

Publication: "Rome 'Trimline' Primary Distribution System," Electrical Construction and Maintenance, January 1959, pages 62 and 63.